United States Patent [19]
Dougherty

[11] Patent Number: 6,013,725
[45] Date of Patent: Jan. 11, 2000

[54] LOW TEMPERATURE CROSSLINKABLE LATEXES FORMED BY IN-SITU GENERATION OF A CROSSLINKABLE FUNCTIONALITY

[75] Inventor: Shawn Marie Dougherty, Gray, Tenn.

[73] Assignee: Eastman Chemical Company, Kingsport, Tenn.

[21] Appl. No.: 08/906,659

[22] Filed: Aug. 7, 1997

Related U.S. Application Data

[60] Provisional application No. 60/029,530, Oct. 31, 1996.
[51] Int. Cl.$^7$ ....................................... C08F 8/30
[52] U.S. Cl. ................... 524/831; 525/328.2; 525/329.4; 525/330.5; 525/377
[58] Field of Search .......................... 524/831; 525/328.2, 525/329.4, 330.5, 377

[56] References Cited

U.S. PATENT DOCUMENTS

| | | | |
|---|---|---|---|
| 3,261,796 | 7/1966 | Simms | 260/29.6 |
| 3,929,744 | 12/1975 | Wright et al. | 260/80.73 |
| 5,268,417 | 12/1993 | Filges et al. | 524/714 |
| 5,539,073 | 7/1996 | Taylor et al. | 526/323 |

FOREIGN PATENT DOCUMENTS

| | | |
|---|---|---|
| 0 377 313 | 7/1990 | European Pat. Off. . |
| 2 306 999 | 11/1976 | France . |

OTHER PUBLICATIONS

Robin W. Dexter, Robert Saxon, Denise E. Fiori, *m–TMI, A Novel Unsaturated Aliphatic Isocyanate*, American Cyanamid Comapany, Stamford, CT 06904, pp. 534–539.

Hiroo Tanaka and lars Odberg, *Preparation of Cationic Polyacrylamides by a Modified Hofmann Reaction: Fluorescent Labeling of Cationic Polyacrylamides*, Journal of Polymer.

Haruma Kawaguchi, Hirotomo Hoshino, Hajime Amagasa, Yasuji Ohtsuka, *Modifications of a Polymer Latex*, Journal of Colloid and Interface Science, vol. 97, No. 2, Feb., 1984, pp. 465–475.

A. M. Schiller, T. J. Suen, *Ionic Derivatives of Polyacrylamide*, Industrial and Engineering Chemistry, vol. 48, No. 12, Dec., 1956, pp. 2132–2137.

Patent Abstracts of Japan, vol. 007, No. 108 (C–165), May 11, 1983 & JP 58 029823 A Deitsuku Haakiyuresu KK, Jul. 23, 1992, see abstract.

Patent Abstracts of Japan, vol. 016, no. 544 (C–1004), Nov. 13, 1992 & JP 04 202897 A (Mitsui Toatsu Chem Inc), Jul. 23, 1992, see abstract.

Database WPI, Section Ch, Week 9538, Derwent Publications Ltd., London, GB; Class A14, AN 95–290443 XP002055439 & JP 07 188 332 A (Mitsui Toatsu Chem Inc), Jul. 25, 1995, see abstract.

Kawaguchi et al, "Modifications of a Polymer Latex", J. Coll. Int. Sci. Feb. 1998.

Tanaka et al, Journal of Polymer Sci., 1989.

Schiller et al, I=E Chem., 1956.

*Primary Examiner*—Edward J. Cain
*Attorney, Agent, or Firm*—Rose M. Allen; Harry J. Gwinnell

[57] ABSTRACT

The present invention provides crosslinkable latex compositions formed by free-radical emulsion polymerization of monoethylenically unsaturated monomers containing an amide functionality and optionally, additional copolymerizable monoethylenically unsaturated monomers. The amide functionality on the polymer is transformed into isocyanate and/or amine groups by addition of an alkali hypohalide. The polymer may further include an optional crosslinking additive to further facilitate crosslinking of the latex.

20 Claims, No Drawings

LOW TEMPERATURE CROSSLINKABLE LATEXES FORMED BY IN-SITU GENERATION OF A CROSSLINKABLE FUNCTIONALITY

This application claims the benefit of the filing of U.S. provisional application Ser. No. 60/029,530, filed Oct. 31, 1996.

BACKGROUND OF THE INVENTION

1. Field of the Invention

This invention relates to low temperature crosslinkable latexes containing crosslinkable functionalities, which are in-situ, generated from an amide functionality on the polymer backbone. The crosslinkable latex compositions of the present invention are suitable for a number of applications such as textile backcoating, wood coating, leather coating, cementitious coating or paper coating and the like.

2. Description of the Related Art

U.S. Pat. No. 5,268,417, discloses an aqueous dispersion of a copolymer obtained by free-radical polymerization and containing at least one aldehyde or keto group; the dispersion contains at least one polyisocyanate in which the isocyanate groups are blocked with oxime. However, the dispersions of the reference present the disadvantage of emitting volatile organic compounds (VOC) upon deblocking of the isocyanate group.

U.S. Pat. No. 3,261,796 refers to modifying a carboxylic acid-containing latex with aziridine to produce amine groups on the polymer backbone. However, this reference exhibits the disadvantage of using toxic aziridine chemistry.

The publication by A. M. Schiller, et al, "Ionic Derivatives of Polyacrylamide", Industrial and Engineering Chemistry, 2132–2137, Vol. 48 (1956), refers to a polyacrylamide made in an aqueous solution by free-radical polymerization which was subsequently transformed into sulfomethylated polyacrylamide in an aqueous solution. The reference further refers to a way of converting polyacrylamide into a cationic derivative or a polymer containing basic groups. This was achieved by reacting the aqueous solution of polyacrylamide with hypobromide or hypochloride and isolating the polymer by neutralization with HCl and subsequent precipitation by salting-out effect. The salting-out was facilitated by the presence of the large concentration of sodium carbonate and sodium chloride.

Kawaguchi, et al, Journal of Colloid and Interface Science, Vol. 97, 465–475 (1984), refers to a monodisperse styrene-acrylamide copolymer latex prepared by an emulsifier-free aqueous polymerization and subsequent modification of the latex to obtain a series of polymer latexes having the same particle size but different kinds and different amounts of functional groups on their surface. Thus, the amide groups were converted to COOH by hydrolysis, to OH-containing groups by reaction with HCHO, to $NH_2$ by the Hofmann reaction, to $NR_2$ by the Mannich reaction, and to $SO_3$-containing groups by the treatment with $NaHSO_3$.

Tanaka et al, Journal of Polymer Science: Part A: Polymer Chemistry, Vol. 27, 4329–4339 (1989), refers to cationic polyacrylamides which contain both primary and quaternary amines, which were prepared according to a Hofmann reaction by adding choline chloride to a solution of polyacrylamide in water. The polymer solutions of the reference are used as flocculants. The polyacrylamide of the reference was synthesized by aqueous solution polymerization of acrylamide with potassium persulfate-isopropanol redox initiator. Sodium hypochloride solution was prepared by passing chlorine gas through a sodium hydroxide solution. The aqueous solution of the sodium hydrochloride prepared above was mixed with an aqueous solution of polyacrylamide to form primary and quaternary amines.

U.S. Pat. No. 5,539,073 to Taylor et al, refers to polymers useful in coating compositions, prepared by a free radical polymerization. The polymers of the reference possess pendant allylic groups which are capable of effecting free-radical flux when the compositions are applied to a substrate and exposed to oxygen.

The publication by R. W. Dexter, et al, "m-TMI, a novel unsaturated aliphatic isocyanate", Polymer Material Science and Engineering, 534–539, Vol. 53 (1985), refers to the use of $\alpha,\alpha$-dimethyl-meta-isopropanol benzyl isocyanate (m-TMI available from American Cyanamid Company). The incorporation of the pendant functionality is accomplished by reaction of m-TMI via copolymerization to introduce pendant aliphatic isocyanate, or via post-reaction of m-TMI with a polymer containing hydroxyl, —NH or —SH groups on the backbone to introduce pendant unsaturation on the backbone of the polymer. The authors indicate that this material has the ability to undergo copolymerization in aqueous emulsion systems with minimal hydrolysis of the isocyanate functionality. The low reactivity of this highly hindered isocyanate is also discussed. However, m-TMI is an expensive monomer.

Thus, there exists a need for crosslinkable latex compositions that do not require the use of expensive reagents such as $\alpha,\alpha$-dimethyl-meta-isopropanol benzyl isocyanate (m-TMI); do not require the use of blocked isocyanates that need to be deblocked in a separate step after latex synthesis; do not require functionalities such as allyl or alkyd double bonds that need to be oxidatively activated by dryers; do not require the use of crosslinking chemistry that results in the release of protective groups that create volatile organic compounds (VOC) such as formaldehyde or methanol; and do not require excessive high heating or addition of acid or heavy metal catalysts.

It is an object of the present invention to overcome the deficiencies in the art by providing low temperature crosslinkable latex compositions which are suitable for coating, backcoating, or adhesives formulations; do not generate undesirable VOC side products; and contain low levels of amide functionality.

It is another object of the present invention to provide crosslinkable latex compositions exhibiting good tensile properties and chemical resistance properties, without the disadvantages mentioned above.

SUMMARY OF THE INVENTION

Applicant has discovered novel crosslinkable latex compositions which exhibit good tensile properties and chemical resistance properties suitable for coatings applications, adhesives and backcoating applications among others.

The crosslinkable latex compositions of the present invention are formed by emulsion polymerization of at least one monoethylenically unsaturated monomer containing an least one amide functionality. Optionally, additional copolymerizable monoethylenically unsaturated monomers may be incorporated into the latex. The amide functionality on the latex polymer particle is subsequently transformed into isocyanate and/or amine groups, preferably by addition of an alkali hypohalide. The isocyanate and amine groups initiate self-crosslinking of the polymer latex. Optionally, crosslinking additives suitable for crosslinking by reaction with isocyanate or amine groups may also be added to promote crosslinking of the latex polymer.

DESCRIPTION OF THE PREFERRED EMBODIMENTS

The present invention provides crosslinkable latexes formed by free-radical emulsion polymerization of monoethylenically unsaturated monomers containing at least one amide group; homopolymerized or optionally, copolymerized with additional copolymerizable monoethylenically unsaturated monomers. The amide functionality on the latex particle is subsequently transformed into isocyanate groups and/or amine groups, preferably by addition of an alkali hypohalide or other compound capable of transforming an amide group into isocyanate and/or amine groups. The thus formed isocyanate or amine groups on the polymer initiate self-crosslinking of the latex polymer. Optionally, crosslinking additives suitable for crosslinking by reaction with isocyanate and/or amine groups may be added to further promote crosslinking of the latex. The above transformation may be depicted by Scheme I below.

such as acrylamide and methacrylamide. The monoethylenically unsaturated monomer containing at least one amide group is typically present in an amount of from 0.05 to 30.0 wt %, based on the total amount of monoethylenically unsaturated monomers. A more preferred amount for the monoethylenically unsaturated monomer containing an amide group is 2.0 to 15.0 wt %, while the most preferred amount is from 3.0 to 8.0 wt %. In the case of homopolymerization of (meth)acrylamide, the total weight percent of the monoethylenically unsaturated monomer having amide functionality would be 100 percent.

Optional Additional Copolymerizable Monoethylenically Unsaturated Monomers

Suitable copolymerizable monoethylenically unsaturated monomers for use as additional copolymerizable monomers include, but are not limited to, monoethylenically unsaturated monomers represented by the general formula:

$$CH_2=C(R^1)COOR^2 \quad \text{(I)}$$

where $R^1$ is hydrogen or a $C_1$–$C_3$ alkyl group, and $R^2$ is a $C_1$–$C_{20}$ alkyl group, phenyl, benzyl, hydroxy-($C_1$–$C_4$)-alkyl,

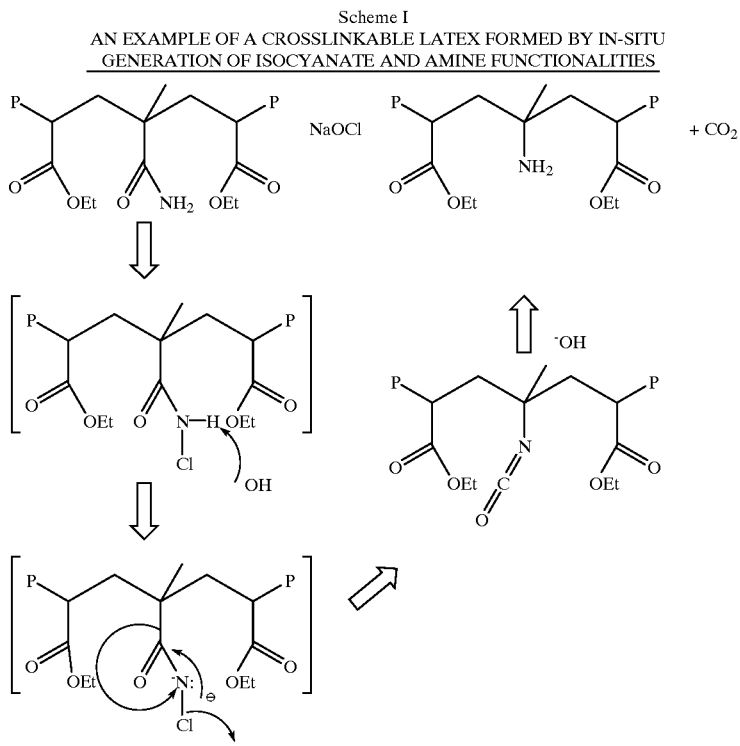

Although not wishing to be bound by any particular theory, it is believed that the amide functional group of the latex polymer is located substantially on the surface of the latex particle and is thereby readily available for reaction to form an isocyanate or amine group.

Preparation of the Latex Polymer with Amide Functionality

Any monomer or macromonomer containing an amnide functional group and being capable of homopolymerization or copolymerization in an emulsion polymerization process is suitable for use in the present invention. The term "macromonomer" refers to a macromolecule having at least one polymerizable site. Further, a "macromolecule" is a large molecule containing a large number of monomeric units. Preferred monomers are commercially available monomers $C_1$–$C_4$ alkoxy-($C_1$–$C_4$) alkyl, cyclopentyl, cyclohexyl, furyl, $C_1$–$C_4$ alkyl furyl, tetrahydrofuryl, $C_1$–$C_4$ alkyl tetrahydrofuryl and combinations of these monomers thereof. Combinations of monomers where $R^1$ is hydrogen and monomers where $R^1$ is an alkyl group are used to modify the glass transition temperature (Tg) of the vinyl polymer.

Preferred examples of these type comonomers are, but not limited to, methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, isooctyl (meth)acrylate, isodecyl (meth)acrylate, lauryl (meth)acrylate, stearyl (meth)acrylate, phenoxyethyl (meth)acrylate, methoxyethyl (meth)acrylate, benzyl (meth)acrylate, ethoxyethyl (meth)acrylate, 2-ethylhexyl (meth)

acrylate, cyclopentyl (meth)acrylate and isobornyl (meth) acrylate, as well as combinations of those monomers thereof. The term "alkyl" is used to denote straight chain or branched alkyl groups. Further, the term "(meth)acrylate" is used throughout this application to denote either acrylates or methacrylates. A combination of these monomers may be used in order to achieve the desired Tg for the latex polymer. Acrylic and methacrylic acid esters having a $C_1$–$C_{20}$ alcohol moiety are commercially available or can be prepared by known esterification processes. In addition, acrylic and methacrylic acid esters may contain additional functional groups, such as, hydroxyl, amine, halogen, ether, carboxylic acid, nitrile, and alkyl group. Preferred (meth)acrylate esters include methyl (meth)acrylate, ethyl (meth)acrylate, butyl (meth)acrylate, ethyihexyl (meth)acrylate, and isobornyl methacrylate.

Other suitable second copolymerizable monoethylenically unsaturated monomers include styrenic monomers. Styrenic monomers denotes styrene or substituted styrenes such as $C_1$–$C_6$ alkyl ring-substituted styrene; $C_1$–$C_3$ alkyl α-substituted styrene; or a combination of ring and α-alkyl substituted styrene. Preferred styrenic copolymerizable monomers include styrene, p-methyl styrene, o-methyl styrene, p-butyl styrene, α-methyl styrene and combinations thereof.

Additional suitable second copolymerizable monoethylenically unsaturated monomers are those represented by the general formula:

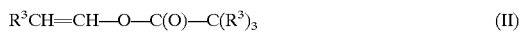

wherein $R^3$ is independently hydrogen or an alkyl group of up to 12 carbon atoms. Particular useful vinyl monomers of formula (H) include: $CH_2=CH-O-C(O)-CH_3$, $CH_2=CH-O-C(O)-C(CH_3)_3$, $CH_2=CH-O-(O)-CH(C_2H_5)(C_4H_9)$, and $CH_2=CH-O-C(O)-CH_2CH_3$.

Vinyl alcohols also represent a suitable class of second copolymerizable monomers, in accordance with the present invention.

In a preferred embodiment of the present invention, a copolymerizable monomer known to promote wet adhesion may be used as the second monomer. Examples of wet adhesion promoting monomers include, but are not limited to, nitrogen-containing monomers such as t-butylaminoethyl methacrylate, dimethylaminoethyl methacrylate, diethylaminoethyl methacrylate, N,N-dimethylaminopropyl methacrylamide, 2-t-butyl-aminoethyl methacrylate, N,N-dimethylaminoethyl acrylate and N-(2-methacryloyloxyethyl) ethylene urea.

In another preferred embodiment, at least one ethylenically unsaturated copolymerizable surfactant may be employed. Copolymerizable surfactants possessing isopropenyl phenyl or allyl groups are preferred. Copolymerizable surfactants may be anionic surfactants, such as those containing a sulfate or sulfonate group, or nonionic surfactants. Other copolymerizable surfactants include those containing polyoxyethylene alkyl phenyl ether moieties and sodium alkyl allyl sulfosuccinate.

In general, the latex polymer of the present invention may be formed by conventional free-radical initiated emulsion polymerization techniques. The polymerization can be initiated by a water-soluble or water-dispersible free-radical initiator, optionally in combination with a reducing agent, at an appropriate temperature. The polymerization of the monomers may be conducted batch wise, semi-batch or in a continuous mode.

Although a surfactant-free latex can be prepared in accordance with the present invention, a conventional surfactant or a combination of surfactants may be used such as anionic or non-ionic emulsifiers. Examples of preferred surfactants include, but are not limited to, alkali or ammonium alkylsulfates, alkylsulfonic acids, fatty acids, oxyethylated alkylphenols, or any combination of anionic or non-ionic surfactant. An additional preferred surfactant is HITENOL HS-20, a polyoxyethylene alkylphenyl ether ammonium sulfate, available from DKS International, Inc., Japan. A list of useful surfactants is available in the treatise: McCutcheon's Emulsifiers & Detergents, North American Edition and International Edition, MC Publishing Co., Glen Rock, N.J., 1993. The amount of surfactant used is typically up to 6 wt %, based on the total weight of the monomers.

Water-dispersible and water-soluble polymers may also be employed as surfactants or stabilizers in the polymerization process. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137,961; and alkali-soluble acrylic resins as described in U.S. Pat. No. 4,839,413, all of which are incorporated herein by reference. Surfactants and stabilizers may be used during the polymerization to control, for example, particle nucleation and growth, particle size and stability or they may be post added to enhance stability of the latex or modify other properties of the latex such as surface tension, wetability and the like.

Useful initiators include any conventional free-radical initiators such as hydrogen peroxide, t-butylhydroperoxide, ammonium or alkali sulfate, di-benzoyl peroxide, lauryl peroxide, di-tertiarybuperoeroxide, 2,2'-azobisisobuteronitrile, benzoyl peroxide, and the like. The amount of initiator is typically between 0.05 to 6.0 wt %, based on the total weight of the monomers. A free-radical initiator may be combined with a reducing agent to form a redox initiating system.

Suitable reducing agents are those which increase the rate of polymerization and may include, for example, sodium bisulfide, sodium hydrosulfide, sodium formaldehyde-sulfoxylate, ascorbic acid, isoascorbic acid and mixtures thereof. The redox initiating system can be used at similar levels as the free-radical initiators.

In combination with the above reducing agents, polymerization catalysts may also be used. Polymerization catalysts are those compounds which increase the rate of polymerization by promoting decomposition of the free-radical initiator in combination with the reducing agent at the reaction conditions. Suitable catalysts include transition metal compounds such as ferrous sulfate heptahydrate ($FeSO_4 \cdot 7H_2O$), ferrous chloride, cupric sulfate, cupric chloride, cobalt acetate, cobaltous sulfate, and mixtures thereof.

Low levels of chain transfer agents may also be used in accordance with the present invention. Suitable chain transfer agents include, but are not limited to, butyl mercaptan, n-octylmercaptan, n-dodecyl mercaptan, butyl or methyl mercaptopropionate, mercaptopropionic acid, 2-ethylhexyl-3-mercaptopropionate, n-butyl-3-mercaptopropionate, isodecylmercaptan, octadecylmercaptan, mercaptoacetic acid, haloalkyl compounds, such as carbon tetrabromide and bromodichloromethane and the reactive chain transfer agents described in U.S. Pat. No. 5,247,040, incorporated herein by reference. In particular, mercaptopropionate, allyl mercaptopropionate, allyl mercaptoacetate, crotyl mercaptopropionate and crotyl mercaptoacetate, and mixtures thereof, represent preferred chain transfer agents.

A preferred molecular weight range for the latex polymers is a weight average molecular weight (Mw) of from 1,000 to 8,000,000, as determined by gel permeation chromatography (GPC). A more preferred range for the weight average molecular weight is from 5,000 to 500,000.

A preferred particle size for the latex polymers is from 0.01 to 3.0μ. In a preferred embodiment of the present invention the particle size of a dispersion formed by emulsion polymerization may range from about 0.05 to about 1.5μ. A more preferred range is 0.1 to 1.0μ. The polymer particles generally have a spherical shape. In one embodiment in accordance with the present invention, the spherical polymer particle has a core portion and a shell portion or a gradient structure. The core/shell polymer particles may also be prepared in a multi-lobe form, a peanut shell, an acorn form, a raspberry form or any other form. Further, the shell of a core/shell particle may fully or partially cover the core of the particle. It is further preferred, wherein particles have a core/shell structure that the core portion comprises about 20 to about 80 wt % of the total weight of the particle, and the shell portion comprises about 80 to about 20 wt % of the total weight of the particle.

The glass transition temperature (Tg) of the latex polymer in accordance with the present invention, may be up to about 100° C. In a preferred embodiment of the present invention, where film forming at ambient temperatures of the particles is desirable, the glass transition temperature may preferably be under 60° C.

Transformation of Amide Groups

The latex polymers having amide functionality are reacted in the presence of a compound that transforms the amide functionality into isocyanate and/or amine groups, such as shown in Scheme I above. Preferably, this transformation occurs as a Hoffman-type rearrangement. Preferred reagents for initiation of this transformation are, but are not limited to, alkali hypohalides such as, alkali hypochlorite or alkali hypobromite. More preferred are sodium hypochlorite, NaOCl and sodium hypobromite, NaOBr. A preferred amount of the alkali hypohalide reagent is 0.1 to 1.0 molar equivalent based on the amide functionality. In the case of alkali hypochlorite, the amount of alkali hypochlorite is calculated based on available chlorine, as determined by titration using ASTM test method D2022-89, "Test Methods of Sampling and Chemical Analysis of Chlorine-Containing Bleaches."

Optional additives may also be used to control the transformation of amide groups to isocyanate and/or amine groups. Preferred optional additives include a base, such as an alkali hydroxide. The addition of alkali hydroxide facilitates formation of a higher amount of amine groups versus isocyanate groups. The relative amounts of alkali hypohalide and alkali hydroxide may be used to produce the desired functionality. The preferred alkali moiety is sodium or potassium, present in an amount of up to 3.0 molar equivalents based on amide groups present in the latex.

Because sodium chloride and sodium hydroxide may be present as by-products of this addition step, the latex may optionally be dialyzed either just after addition of the alkali hypohalide or just after addition of the crosslinking additive, for as long as necessary if these salts cannot be accommodated in the final latex.

Optional Crosslinking Additives

The thus formed latex polymers are capable of self-crosslinking due to the presence of isocyanate and/or amine groups. However, it may be desirable to also add crosslinking additives to further promote crosslinking. The crosslinking additive may be present in an amount up to 1.0 equivalent based on the amount of amide group. The crosslinking additive should contain at least one group suitable for reaction with the isocyanate and/or amine groups formed on the polymer.

By way of example, a polyisocyanate may be used as the crosslinking additive. Suitable polyisocyanates include aliphatically-, cycloaliphatically- and/or aromatically-bound isocyanate groups. Examples of suitable polyisocyanates which may be used include ethylene diisocyanate, 1,4-tetramethylene diisocyanate, 1,6-hexamethylene diisocyanate, 2,4,4-trimethyl-1,6-hexamethylene diisocyanate, 1,12-dodecane diisocyanate, cyclobutane-1,3-diisocyanate, cyclohexane-1,3- and/or -1,4-diisocyanate, 1-isocyanato-2-isocyanatomethyl cyclopentane, 1-isocyanato-3,3,5-trimethyl-5-isocyanatomethyl cyclohexane (isophorone diisocyanate or IPDI), 2,4- and/or 2,6-hexahydrotoluylene diisocyanate, 2,4'- and/or 4,4'-dicyclohexylmethane diisocyanate, α,α,α',α'-tetramethyl-1,3- and/or -1,4-xylylene diisocyanate, 1,3- and 1,4-xylylene diisocyanate, 1-isocyanato-1-methyl-4(3)-isocyanatomethyl-cyclohexane, 1,3- and 1,4-phenylene diisocyanate, 2,4- and/or 2,6-toluylene, 'diisocyanate, diphenyl methane- 2,4'- and/or -4,4'-diisocyanate, naphthalene-1,5-diisocyanate, triphenyl methane-4,4'4"-triisocyanate, polyphenyl polymethylene polyisocyanates of the type obtained by condensing aniline with formaldehyde followed by phosgenation, and mixtures of the above-mentioned polyisocyanates.

Additional crosslinking additives include polyhydric aliphatic, alicyclic and aralkyl alcohols. Suitable polyhydric alcohols include ethylene glycol, diethylene glycol, glycerin, pentaerythritol, 1,2- and 1,3-propanediol, 1,3- and 1,4-butanediol, 1,6-hexanediol, 1,8-octanediol, neopentyl glycol, diethylene glycol, 2-methyl-1,3-propanediol, 2,4-dimethyl-2-ethylhexane-1,3-diol, 2,2-dimethyl-1,3-propane diol, the various isomeric bis-hydroxymethyl cyclohexanes, 2-ethyl-2-butyl-1,3-propanediol, 2-ethyl-2-isobutyl-1,3-propanediol, 2,2,4-trimethyl-1,3-pentanediol, 2,2,4-trimethyl-1,6-hexanediol, glycerin and trimethylol propane; preferably dihydric alcohols such as 1,3-propanediol, 1,3-butanediol, 1,4-butanediol, 1,4-cyclohexane dimethylol, 1,5-pentanediol, 1,6-hexanediol, diethylene glycol, triethylene glycol or tetraethylene glycol; hydroxypivalyl, hydroxypivalate, neopentyl glycol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, and p-xylylenediol.

In addition, additives such as amine-alcohols including lysine, cytosine, histidine, guanine, dimethyl ethanol amine and the like may be used.

Macromolecular crosslinking reagents such as poly (ethylene glycol) or a mixture of a glycol and an amine functional reagent may also be used. Examples of suitable poly(ethylene glycols) include relatively high molecular weight poly(ethylene glycols), some of which are commercially available under the designation "CARBOWAX", a product available from Union Carbide. Diethylene glycol is also especially suitable. Suitable macromolecular crosslinking reagents also include polyethylene amine and melamine.

Optionally, at least one difunctional reactant selected from a hydroxycarboxylic acid having one —$CR_2$—OH, an aminocarboxylic acid having one —NRH group, an amino-alcohol having one —$CR_2$—OH group and one —NRH group or mixtures thereof may be used as the crosslinking additive. In these formulae, each R is independently a hydrogen atom or an alkyl group of 1 to 4 carbon atoms. Preferred crosslinking additives include pentaerythritol, glycerin, trimethylol propane, or any other crosslinking nucleophilic reagent.

The reaction of the crosslinking additive with the isocyanate or amine formed on the polymer backbone may further be facilitated by the addition of a catalyst such as 4-dimethyl aminopyridine.

The self-crosslinking latex compositions prepared as described above may be applied to substrates such as textiles, leather, wood, cement and paper by coating or impregnating the substrates. An example of this type application includes, but is not limited to, backcoating formulations for use in textiles.

Having generally described this invention, a further understanding can be obtained by reference to certain specific examples provided herein for purpose of illustration only, and are not intended to be limiting unless otherwise specified.

EXAMPLES

Example 1
Preparation of Latex

All reactions were carried out under an atmosphere of nitrogen in a glass jacketed vessel with stirring at 400 rpm. Water (1000 mL), sodium bicarbonate (0.979 g), and sodium dodecyl sulfate, (SDS, 0.48 g) were added to a jacketed glass reactor vessel and heated to 80° C. In the meantime, methyl methacrylate (MMA, 216.3 g) and butyl acrylate (BA, 1676.0 g) were combined and 10% of this mixture (189.2 g) was set aside. Also methacrylamide (MAAM 91.2 g) and SDS (1.74 g) were dissolved in water (650 g) and 10% of this solution (74.3 g) was added to the reaction vessel at 80° C. along with the 10% of the MMA and BA monomer portion (189.2 g) and potassium persulfate (10.7 g). The two monomer flasks were combined and after the reaction vessel had heated 30 minutes at 80° C. in the monomer mixture was fed to the reactor (14.8 g/min). The catalyst feed (0.954 g/min) was started 75 minutes after the monomer feed. The catalyst consisted of water (89 g) and potassium persulfate (1.60 g). After all the catalyst was in, the reaction was allowed to heat an additional 30 minutes and was then cooled to 60° C. Isoascorbic acid (4.0 g) was added followed by ferrous ammonium sulfate (31 mg), and ethylenediamine tetraacetic acid (EDTA, 25 mg) dissolved in water (4 mL). Finally t-butylhydroperoxide (70%, 0.40 g) was added directly to the vessel and a mixture of t-butylhydroperoxide (70%, 1.18 g) in water (39 mL) was added over 30 minutes. The resulting latex had an effective diameter of 228 nm, a polydispersity of 0.035 nm, and was 50.67% solids, with less than 500 ppm total residual monomer. Pentaerythritol (20.0 g) was added to a 3 liter sample of this latex as a crosslinking additive to promote crosslinking. Crosslinking of the latex was initiated by adding 10 g NaOCl (9.44% available chlorine) per 100 g latex.

The sample had improved gel, swell and tensile properties. Analysis indicated that it had an improved combination of flexibility and strength as compared to commercial latexes.

Example 2
Preparation of Latex with High Level of Amide Functionality

Water (200 mL), sodium bicarbonate (0.489 g), and SDS (0.09 g) was added to a jacketed glass reactor vessel and heated to 80° C. In the meantime, MMA (54.0 g) and BA (419 g) were combined and 10% of this mixture (47.3 g) was set aside. Also MAAM (68.4 g) and SDS (0.32 g) was dissolved in water (300 g) and 10% of this solution (36.9 g) was added to the reactor vessel at 80° C., along with the 10% of the MMA and BA monomer portion (47.3 g) and potassium persulfate (2.67 g). The remaining 90% of the two monomer-containing flasks were combined and after the reaction vessel had heated 30 minutes at 80° C. the monomer mixture was added with stirring to the vessel (5.61 g/min). The catalyst feed (0.238 g/min) was started 75 minutes after the monomer feed. The catalyst consisted of water (22.3 g) and potassium persulfate (0.40 g). After all the catalyst was in, the reaction was allowed to heat an additional 30 minutes and was then cooled to 60° C. Isoascorbic acid (0.40 g) was added followed by ferrous ammonium sulfate (7.7 mg) and EDTA, (6 mg) dissolved in water (1 mL). Finally t-butylhydroperoxide (70%, 0.10 g) was added directly to the vessel and a mixture of t-butylhydroperoxide (70%, 0.30 g) in water (89 mL) was added over 30 minutes. The resulting latex was 48.7% solids with <500 ppm total trace monomer.

This 15% methacrylamide latex was crosslinked by the addition of one mole NaOCl per mole of amide functionality. At this high level of amide functionality, the shelf life was approximately one hour once the isocyanates were generated.

Example 3
Preparation of Latex without Surfactant

Water (280 mL) and sodium bicarbonate (0.979 g) were added to a jacketed glass reactor vessel and heated to 80° C. Once the water reached 80° C., potassium persulfate (2.67 g) was added and the following two, 4.3 hour monomer feeds were begun. The first feed consisted of MMA (27.0 g), ethylacrylate (EA, 346.4 g), 2-ethylhexyl acrylate (2-EHA, 72.6 g), acrylic acid (AA, 10.7 g) and trimethylolpropane triacrylate (0.92 g). The second feed contained MAAM (13.7 g) dissolved in 50 mL water. The catalyst feed was started 100 minutes after the monomer feed and was added over a period of 3 hour. The catalyst consisted of water (22.3 g) and potassium persulfate (0.40 g). After all the catalyst was in, the reaction was allowed to heat at additional 30 minutes and was then cooled to 60° C. Isoascorbic acid (0.66 g) was added followed by ferrous ammonium sulfate (7.7 mg) and EDTA, (6 mg) dissolved in water (1 mL). Finally t-butylhydroperoxide (70%, 0.10 g) was added directly to the vessel and a mixture of t-butylhydroperoxide (70%, 0.30 g) in water (11.5 mL) was feed in over 30 minutes. The resulting latex was 55.3% solids, Tg of 11° C., trace monomers were EA (336), AA (164) and 2-EHA (154). Results are shown in Table 1 for Gel Fraction and Swell Ratio for the latexes of the present invention compared to commercially available latexes crosslinked using melamine and methylolamine.

Film Gel Fraction and Film Swell Ratio Test Method:

Film gel fraction (FGF) is obtained by determining the insoluble weight fraction of polymer in a dry film sample. Film swell ratio (FSR) is obtained by determining the ratio of ratio of the insoluble polymer weight fraction swollen in the selected solvent (by weight) to dry weight of the insoluble weight fraction in a dry film sample. Average values are determined from quadruplicate measurements with acetone as the solvent.

The procedure used was as follows: for each sample determination, a 4"×4" 325-mesh steel screen and a metal weighing boat are baked in a vacuum oven at 120° C. for 90 minutes, cooled 30 minutes over $P_2O_5$ and weighed (W1 and W2, respectively). After the latex film is dried the required number of days under constant temperature and humidity or baked in the oven at the specified time and temperature, a piece of the film is cut, weighed (W3), placed in the aluminum pan, and put aside. Another film sample is cut, weighed (W4), and placed in a screw cap jar with excess solvent on a shaker bath for 16 hours at constant temperature. The film gel is recovered by pouring the solution plus wet solids from the jar through the screen and then weighing the screen plus retained wet solids (W5). At this point, the screen plus solids and the film sample in the aluminum boat are dried in a forced air oven at 80° C. overnight and then in a vacuum oven at 120° C. for 3 hours and cooled for 30 minutes in a desiccator over $P_2O_5$. The samples are weighed and the vacuum portion of the baking procedure is repeated until reproducible weights are obtained for the screen plus dry solids (W6) and the film sample in the aluminum boat (W7). Calculations were made by the equations shown below:

FGF=(W6−W1)/[(W4)*[(W7−W2)/W3]]

FSR=(W5−W1)/(W6−W1)

TABLE 1

|  | Gel Fraction | | Swell Ratio | |
| --- | --- | --- | --- | --- |
|  | Latex | 150° C. | Latex | 150° C. |
| Example 3 | 56 | 60 | 19 | 15 |
| Example 3 and NaOCl | 76 | 86* | 11 | 5* |
| Melamine crosslinked latex | 77 | 93 | 20 | 6.5 |
| Methylolamine crosslinked latex | 74 | 92 | 16 | 6 |

(*Cured at 100° C.)

Changes in gel fraction and swell upon the addition of bleach to the vinyl polymer were consistent with crosslinking. The resulting films had swell ratios in the range of melamine-cured and methylolamine monomer-containing latexes that required higher temperatures for complete curing.

Example 4
Preparation of Latex with High Tg

Water (250 mL), sodium bicarbonate (0.49 g), and SDS (0.09 g) were added to a jacketed glass reactor vessel and heated to 80° C. In the meantime, MMA (334.0 g) and BA (139 g) were combined and 12% of this mixture (56.8 g) was set aside. Also MAAM (22.3 g) and SDS (0.29 g) were dissolved in water (100 g) and 12% of this solution (14.3 g) was added to the reactor vessel at 80° C. along with the 12% of the MMA and BA monomer portion (56.8 g) and potassium persulfate (2.67 g). The remaining 88% of the two monomer-containing flasks were combined and after the reaction vessel had heated 30 minutes at 80° C., the monomer was added to the vessel (3.97 g/min) with stirring. The catalyst feed (0.233 g/min) was started 50 minutes after the monomer feed. The catalyst consisted of water (22.3 g) and potassium persulfate (0.40 g). After all the catalyst was in, the reaction was allowed to heat an additional 30 minutes and was then cooled to 60° C. Isoascorbic acid (0.4 g) was added followed by ferrous ammonium sulfate (7.7 mg) and EDTA, (6.2 mg) dissolved in water (1 mL). Finally t-butylhydroperoxide (70%, 0.10 g) was added directly to the vessel and a mixture of t-butylhydroperoxide (70%, 0.30 g) in water (11.5 mL) was added over 30 minutes. The resulting 55.3% solids latex had an effective diameter particle size of 347 nm. The minimal film formation temperature (MFT) of the latex was 40° C. The latex was diluted to 40% solids and coalesced to form a film by the addition of 30 pph ethylene glycol butyl ether.

Example 5
Latex Treated with Various Levels of NaOCl and NaOH

Water (320 mL) and sodium bicarbonate (0.39 g) were added to ajacketed glass reactor vessel and heated to 80° C. Once the water reached 80° C., potassium persulfate (2.14 g) was added and the following two, 3 hour monomer feeds were begun. The first feed consisted of MMA (26.0 g), EA (277.1 g), 2-EHA (58.1 g), acrylic acid (AA, 5.72 g) and trimethylolpropane triacrylate (1.33 g). The second feed consisted of MAAM (36.5 g) dissolved in 160 mL water. The catalyst feed was started 100 min after the monomer feed and added over a period of 2 hours. The catalyst consisted of water (22.3 g) and potassium persulfate (0.40 g). After all the catalyst was in, the reaction was allowed to heat at additional 30 minutes and was then cooled to 60° C. Isoascorbic acid (0.53 g) was added followed by ferrous ammonium sulfate (6 mg) and EDTA (5 mg) dissolved in water (1 mL). Finally t-butylhydroperoxide (70%, 0.08 g) was added directly to the vessel and a mixture of t-butylhydroperoxide (70%, 0.24 g) in water (9 mL) was feed in over 30 minutes. The resulting latex was 55.3% solids Tg of −11° C., trace monomers were MMA (7 ppm), EA (634 ppm), AA (ND) and 2-EHA (98 ppm). This latex was reacted with various levels of NaOCl and NaOH and the effect on concentration of isocyanate resonance observed in the film by IR was recorded and is shown below in Table 2.

TABLE 2

| Example 5 | % Isocyanate in dried film by IR | | |
| --- | --- | --- | --- |
| with | Day 0 | Day 1 | Day 3 |
| NaOCl and 2 eq. NaOH | 9% | 8% | 3% |
| NaOCl and 1 eq. NaOH | 10% | 7% | 4% |
| NaOCl and No NaOH | 30% | 15% | 9% |
| 50% NaOCl - 2 eq. NaOH | 3% | 1% | 4% |

The maximum concentration of isocyanate was achieved when one equivalent of NaOCl per amide functionality and no NaOH was added. In all cases the amide functionality of the latex was transformed by adding one mole NaOCl per mole of amide functionality. In the case of a commercially available homogeneous polyacrylamide, substantially less than one molar equivalent of NaOCl was necessary to crosslink the polymer.

Obviously, numerous modifications and variations of the present invention are possible in light of the above teachings. It is therefore to be understood that within the scope of the appended claims, the invention may be practiced otherwise than as specifically described herein.

What is claimed is:

1. A crosslinkable latex composition comprising a crosslinkable polymer formed by free-radical emulsion polymerization of a monoethylenically unsaturated monomer containing at least one amide functional group, and optionally, additional copolymerizable monoethylenically unsaturated monomers, said amide group being transformed to an isocyanate and/or amine groups; and optionally, further comprising a crosslinking additive suitable for crosslinking with said isocyanate and/or amine groups.

2. The crosslinkable latex composition of claim 1 wherein said monoethylenically unsaturated monomer containing at least one amide functional group is (meth)acrylamide.

3. The crosslinkable latex composition of claim 1 wherein said monoethylenically unsaturated monomer containing at least one amide functional group is present in an amount of from 0.05 to 30.0 wt %, based on the total amount of monoethylenically unsaturated monomers.

4. The crosslinkable latex composition of claim 1 wherein said monoethylenically unsaturated monomer containing at least one amide functional group is present in an amount of from 2.0 to 15.0 wt %, based on the total amount of monoethylenically unsaturated monomers.

5. The crosslinkable latex composition of claim 1 wherein said monoethylenically unsaturated monomer containing at least one amide functional group is present in an amount of from 3.0 to 8.0 wt %, based on the total amount of monoethylenically unsaturated monomers.

6. The crosslinkable latex composition of claim 1 wherein said optional crosslinking additive is present in an amount of up to 1.0 equivalent based on the amount of amide group.

7. The crosslinkable latex composition of claim 1 wherein said crosslinking additive is selected from the group consisting of pentaerythritol, glycerin and trimethylol propane.

8. The crosslinkable latex composition of claim 1 further comprising an alkali hypohalide to transform said amide group into isocyanate and/or amine groups.

9. A crosslinkable latex composition comprising:
   a crosslinkable polymer formed by free-radical emulsion polymerization of monoethylenically unsaturated monomers containing at least one amide group, and optionally, additional copolymerizable monoethylenically unsaturated monomers;
   an alkali hypohalide added to said crosslinkable latex to transform said amide groups into isocyanate and/or amine groups; and
   crosslinking additives suitable for crosslinking with said isocyanate and/or amine groups.

10. A method for preparing a crosslinkable latex composition comprising steps of:
    emulsion polymerizing monoethylenically unsaturated monomers containing at least one amide group, and optionally, additional copolymerizable monoethylenically unsaturated monomers,
    transforming said amide group into isocyanate and/or amine groups by reaction with an alkali hypohalide, optionally in the presence of a base; and
    optionally, adding a crosslinking additive to the latex polymer to promote crosslinking.

11. The method of claim 10 wherein the monoethylenically unsaturated monomer containing at least one amide group is present in an amount of from 0.05 to 30.0 wt %, based on the total amount of monoethylenically unsaturated monomers.

12. The method of claim 10 wherein the monoethylenically unsaturated monomer containing at least one amide group is present in an amount of from 2.0 to 15.0 wt %, based on the total amount of monoethylenically unsaturated monomers.

13. The method of claim 10 wherein the monoethylenically unsaturated monomer containing at least one amide group is present in an amount of from 3.0 to 8.0 wt %, based on the total amount of monoethylenically unsaturated monomers.

14. The method of claim 10 wherein said crosslinking additive is present in an amount of up to 1.0 equivalent based on the amount of said amide group.

15. The method of claim 10 wherein said alkali hypohalide is alkali hypochlorite or alkali hypobromite.

16. The method of claim 10 wherein said alkali hypohalide is present in an amount of from 0.1 to 1.0 molar equivalent based on said amide group.

17. The method of claim 10 wherein said alkali hypohalide is added in the presence of a base.

18. The method of claim 17 wherein said base is an alkali hydroxide.

19. The method of claim 18 wherein said alkali hydroxide is present in an amount of up to 3.0 molar equivalents.

20. A method for coating a substrate comprising steps of:
    (a) forming a crosslinkable latex composition by emulsion polymerization of monoethylenically unsaturated monomers containing at least one amide group, and optionally, additional copolymerizable monoethylenically unsaturated monomers; wherein said amide group is transformed into an isocyanate or amine group by addition of an alkali hypohalide, optionally in the presence of a base; and optionally, adding a crosslinking additive to promote crosslinking of the polymer; and
    (b) applying the resulting latex composition to a substrate.

* * * * *